United States Patent
Wang et al.

(10) Patent No.: US 12,075,187 B2
(45) Date of Patent: Aug. 27, 2024

(54) SYSTEMS AND METHODS FOR AUTOMATICALLY GENERATING SOUND EVENT SUBTITLES

(71) Applicant: Netflix, Inc., Los Gatos, CA (US)

(72) Inventors: Yadong Wang, Campbell, CA (US); Shilpa Jois Rao, Cupertino, CA (US)

(73) Assignee: Netflix, Inc., Los Gatos, CA (US)

( * ) Notice: Subject to any disclaimer, the term of this patent is extended or adjusted under 35 U.S.C. 154(b) by 31 days.

(21) Appl. No.: 17/841,564

(22) Filed: Jun. 15, 2022

(65) Prior Publication Data

US 2023/0412760 A1    Dec. 21, 2023

(51) Int. Cl.
| | | |
|---|---|---|
| *H04N 5/93* | (2006.01) | |
| *G10L 15/00* | (2013.01) | |
| *G10L 15/04* | (2013.01) | |
| *G10L 15/22* | (2006.01) | |
| *G10L 15/26* | (2006.01) | |
| *G10L 25/57* | (2013.01) | |
| *G10L 25/81* | (2013.01) | |
| *H04N 5/278* | (2006.01) | |

(52) U.S. Cl.
CPC ......... *H04N 5/9305* (2013.01); *G10L 15/005* (2013.01); *G10L 15/04* (2013.01); *G10L 15/22* (2013.01); *G10L 15/26* (2013.01); *G10L 25/57* (2013.01); *G10L 25/81* (2013.01); *H04N 5/278* (2013.01)

(58) Field of Classification Search
CPC .... H04N 5/9305; H04N 5/278; G10L 15/005; G10L 15/04; G10L 15/22; G10L 15/26; G10L 25/57; G10L 25/81
See application file for complete search history.

(56) References Cited

U.S. PATENT DOCUMENTS

| | | |
|---|---|---|
| 11,342,002 B1 | 5/2022 | Gupta |
| 2017/0278525 A1* | 9/2017 | Wang ..................... G10L 15/20 |
| 2022/0130408 A1 | 4/2022 | Younessian |

OTHER PUBLICATIONS

International Search Report & Written Opinion mailed Oct. 30, 2023 for PCT/US23/67723; 34 pages.
Wang et al., "A First Attempt at Polyphonic Sound Event Detection Using Connectionist Temporal Classification", 2017 IEEE, ICASSP 2017, pp. 2986-2990; 5 pgs.

* cited by examiner

*Primary Examiner* — Girumsew Wendmagegn
(74) *Attorney, Agent, or Firm* — Greenberg Traurig, LLP

(57) ABSTRACT

The disclosed computer-implemented method may include systems and methods for automatically generating sound event subtitles for digital videos. For example, the systems and methods described herein can automatically generate subtitles for sound events within a digital video soundtrack that includes sounds other than speech. Additionally, the systems and methods described herein can automatically generate sound event subtitles as part of an automatic and comprehensive approach that generates subtitles for all sounds within a soundtrack of a digital video—thereby avoiding the need for any manual inputs as part of the subtitling process.

20 Claims, 7 Drawing Sheets

SYSTEMS AND METHODS FOR AUTOMATICALLY GENERATING SOUND EVENT SUBTITLES

BACKGROUND

Subtitles have become a ubiquitous and expected feature of digital video playback. For example, subtitles enable users who are deaf or hard of hearing to understand what is being said during video playback despite not being able to hear the video soundtrack. Additionally, some users may watch a video on mute for a variety of reasons, such as not wanting to disturb a nearby sleeper, not having headphones while watching in a quiet location (e.g., a library), and so forth.

Generating subtitles for a digital video, however, suffers from various technical problems. For example, digital video subtitles are often manually generated. To illustrate, using specialized software, an editor may manually enter subtitle content for a digital video while simultaneously watching the digital video. In some instances, the subtitle generation process may include partial automation. For example, subtitle systems can automatically generate subtitles for spoken words within a soundtrack but may also require manually input of subtitle information for other sounds within the soundtrack.

As such, example subtitle systems fail to automatically generate subtitles that accurately reflect the full soundtrack of a digital video. For example, such subtitle systems do not include an auto-generation component directed to sound events. To illustrate, video soundtracks typically include a range of sounds including speech, music, song lyrics, and sound events (e.g., footsteps, doors opening and closing, car engines, gunshots). While some subtitle systems may support the manual creation of subtitles directed to any of these types of sounds, none of these subtitle systems include components that enable the automatic generation of sound event subtitles. This is particularly problematic for subtitle users when sound events within a digital video soundtrack are "plot critical." In other words, these subtitle users may miss important plot points because such automatically generated subtitles are an inaccurate representation of the whole of a digital video soundtrack.

Additionally, example subtitle systems frequently waste computing resources in generating these often inaccurate subtitles. For example, as mentioned above, the manual subtitle creation process may require an editor to perform excessive numbers of user interactions with computer interfaces in entering subtitle content, correcting prior inputs, moving backward and forward in video playback, and so forth. Furthermore, after those excessive numbers of user interactions, additional computational resources are expended in compiling the editor's subtitle configurations into displayable subtitles.

Moreover, even when subtitle systems include automatic subtitle generation capabilities, those automatic capabilities are limited to a small number of potential soundtrack contents (e.g., often only speech). As such, if an editor wishes to create subtitles that include all of the sounds within a soundtrack (i.e., including sound events), systems are limited to a hybrid method that includes automatically generating some subtitles, requiring manual configuration of other subtitles, and then combining those two types of subtitles into a finalized format. This piecemeal approach, however, is just as computationally inefficient and wasteful as the completely manual subtitle process described above.

SUMMARY

As will be described in greater detail below, the present disclosure describes systems and methods for automatically generating comprehensive subtitles. For example, the systems and methods described herein can automatically generate subtitles from an audio input—such as a digital video soundtrack—that includes subtitles for spoken words, background music, and other sound events beyond speech and music. To illustrate, the systems and methods described herein can generate subtitles for a digital video scene that include a transcription of language currently being spoken, as well as subtitles describing background music for the scene and subtitles describing other sounds heard within the scene (e.g., a door closing, a car driving away, a window being broken). In one or more implementations, and as will be described in greater detail below, the systems and methods described herein generate such comprehensive subtitles utilizing multiple computational models in a defined order, both in serial and in parallel, to process an audio input.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
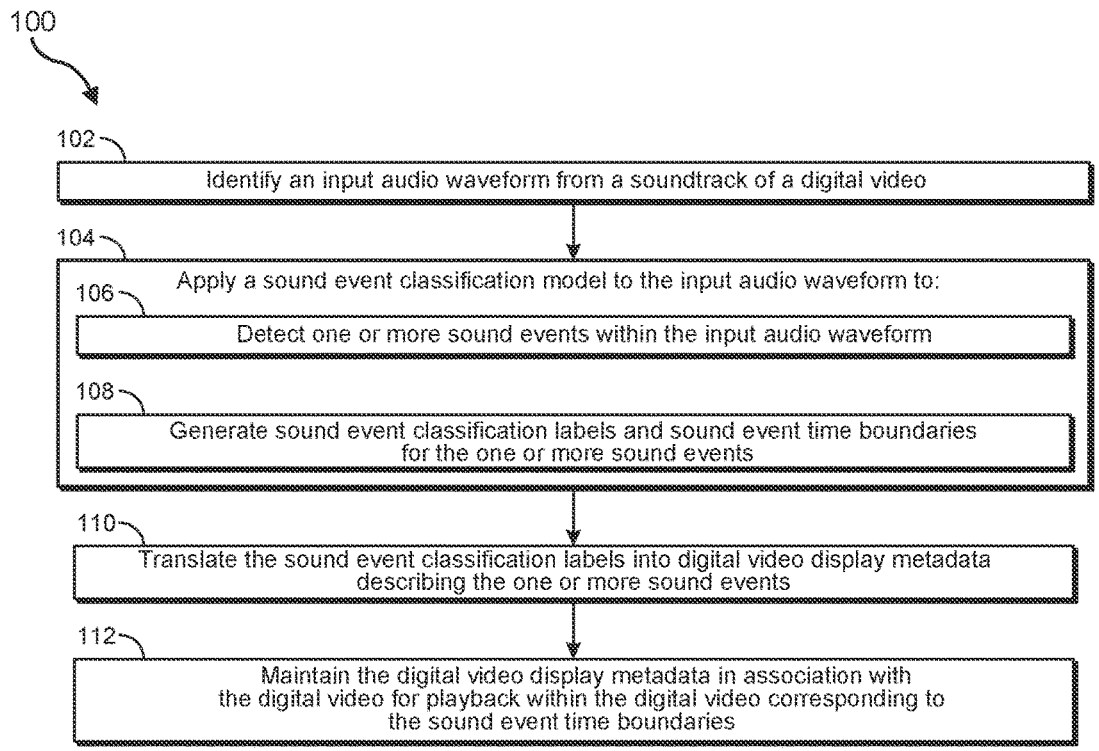
FIG. 1 is a flow diagram of an exemplary computer-implemented method for generating and maintaining sound event classification labels in connection with a digital video soundtrack in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Accordingly, the present disclosure is generally directed to systems and methods for automatically generating comprehensive digital video subtitles for soundtracks including sound events. For example, implementations described herein include a comprehensive subtitle system that automatically generates digital video subtitles drawn toward sound events within the digital video soundtrack. Additionally, the comprehensive subtitle system can automatically generate digital video subtitles drawn toward various other types of sound (e.g., speech, music) within the digital video soundtrack, thereby generating a comprehensive set of subtitles that can provide a user (e.g., deaf, hard of hearing, or on mute) with a complete understanding of the content of the digital video during playback with little or no sound.

As discussed above, example subtitle systems suffer from various technical problems related to the functionality of a computing system. In one or more implementations, a comprehensive subtitle system described herein solves these and other technical issues by training and applying a series of computational models—both serially and in parallel—to waveforms taken from a digital video soundtrack. In at least one implementation, the comprehensive subtitle system can translate the outputs of the computational models into digital video display metadata. Additionally, the comprehensive subtitle system can further generate and maintain digital video subtitles based on the digital video display metadata.

As such, the comprehensive subtitle system avoids the inaccuracies and inefficiencies of example subtitle systems. For example, rather than relying—either in part or in whole—on manual user inputs, the comprehensive subtitle system efficiently utilizes computing resources with a solution that generates comprehensive digital video subtitles with no manual user inputs of subtitle content. Additionally, while example subtitle systems waste processing cycles in compiling and recompiling subtitle data as different types of subtitles (e.g., speech subtitles, music subtitles) that are generated either manually or computationally, the comprehensive subtitle system presents a streamlined approach that processes a digital video soundtrack both sequentially and in parallel to produce a single output of digital video display metadata from which subtitles may be generated.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
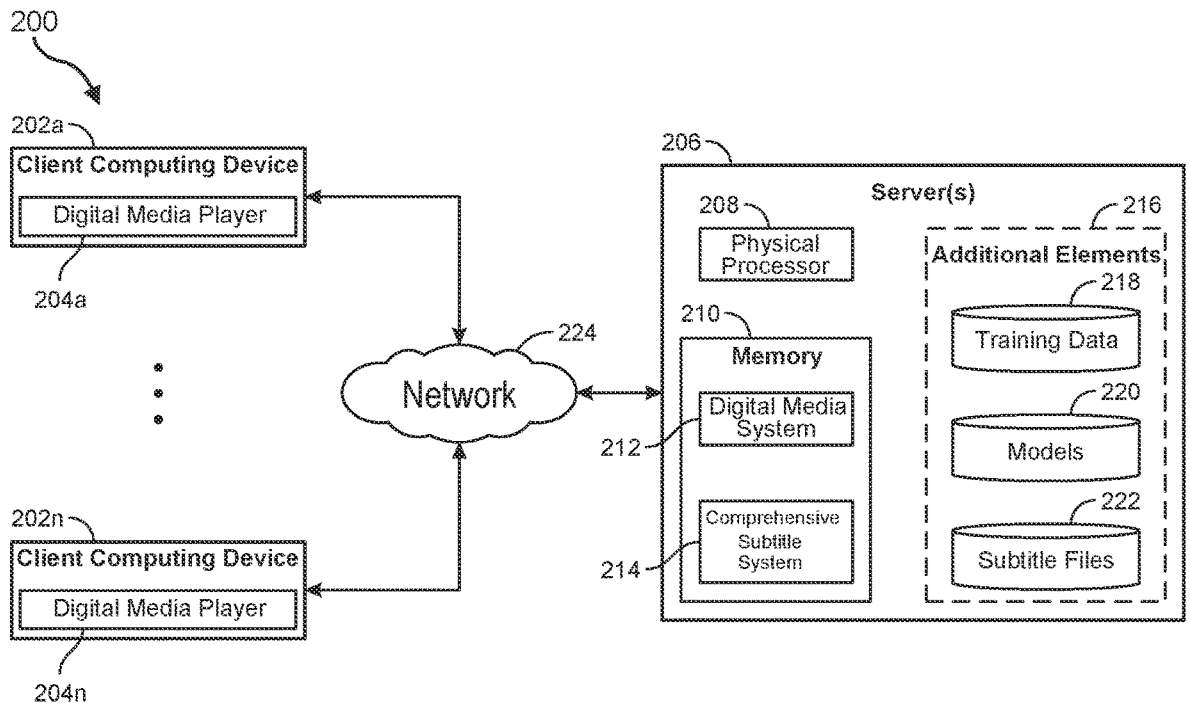
FIG. 2 is a diagram of an environment in which a comprehensive subtitle system may operate in accordance with one or more implementations.
Figure 3:
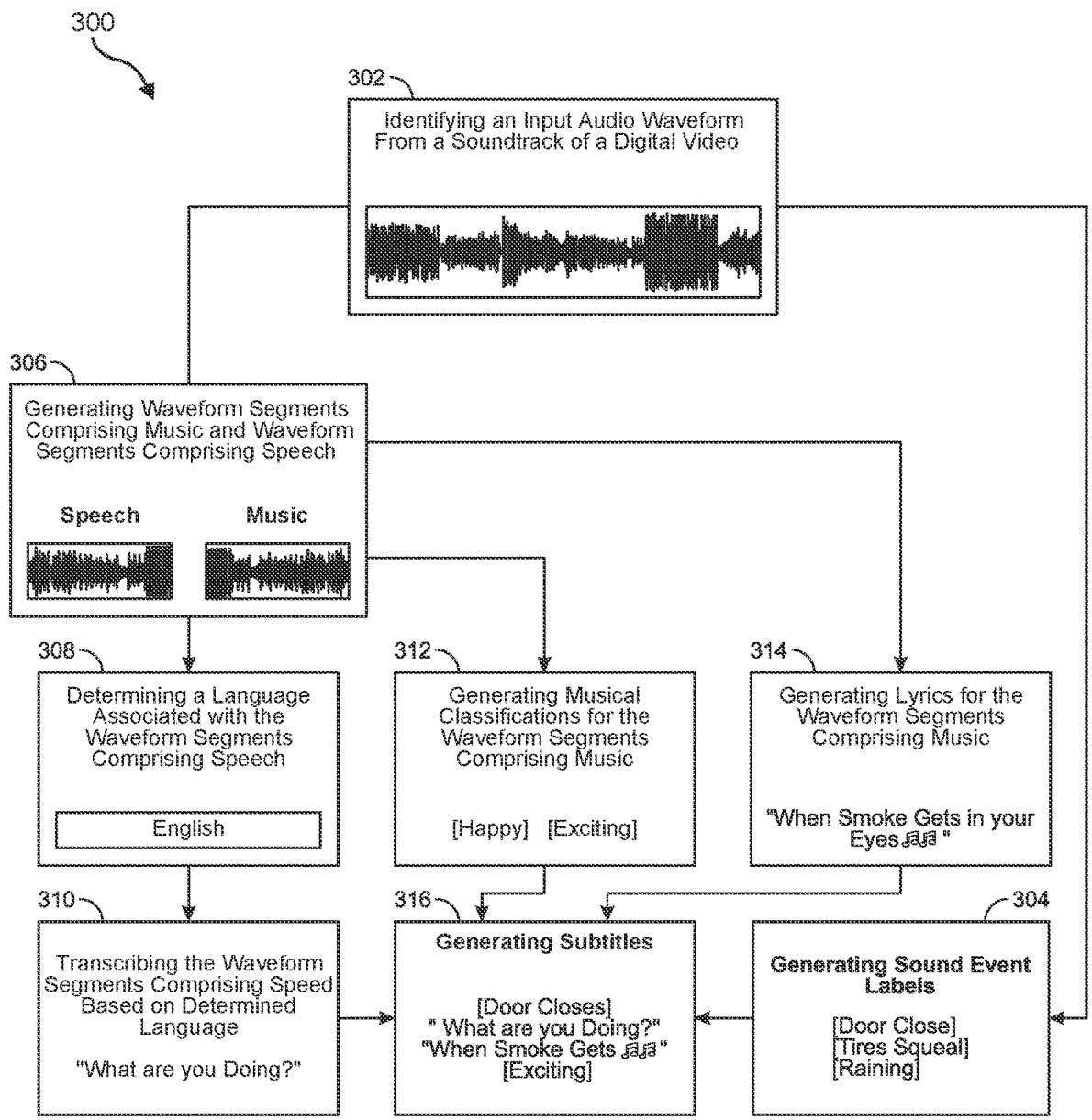
FIG. 3 is a sequence diagram of the comprehensive subtitle system generating comprehensive digital video subtitles in accordance with one or more implementations.

The following will provide, with reference to FIGS. 1-11, detailed descriptions of the comprehensive subtitle system. For example, FIG. 1 is a flow diagram of an exemplary computer-implemented method for automatically generating digital video display metadata associated with sound events in a digital video soundtrack. FIGS. 2-12 illustrate features and functionality of how the comprehensive subtitle system may operate. For example, FIG. 2 includes an environmental overview diagram showing how the comprehensive subtitle system may interact with other systems and computing devices. FIG. 3 is an overview sequence diagram illustrating how the comprehensive subtitle system may generate comprehensive subtitles from a digital video soundtrack. FIGS. 4-9 illustrate individual components of the comprehensive subtitle system and show how these components generate various outputs. FIGS. 4-10 also illustrate how these various components can work with each other in parallel and/or in sequence.

Figure 11:
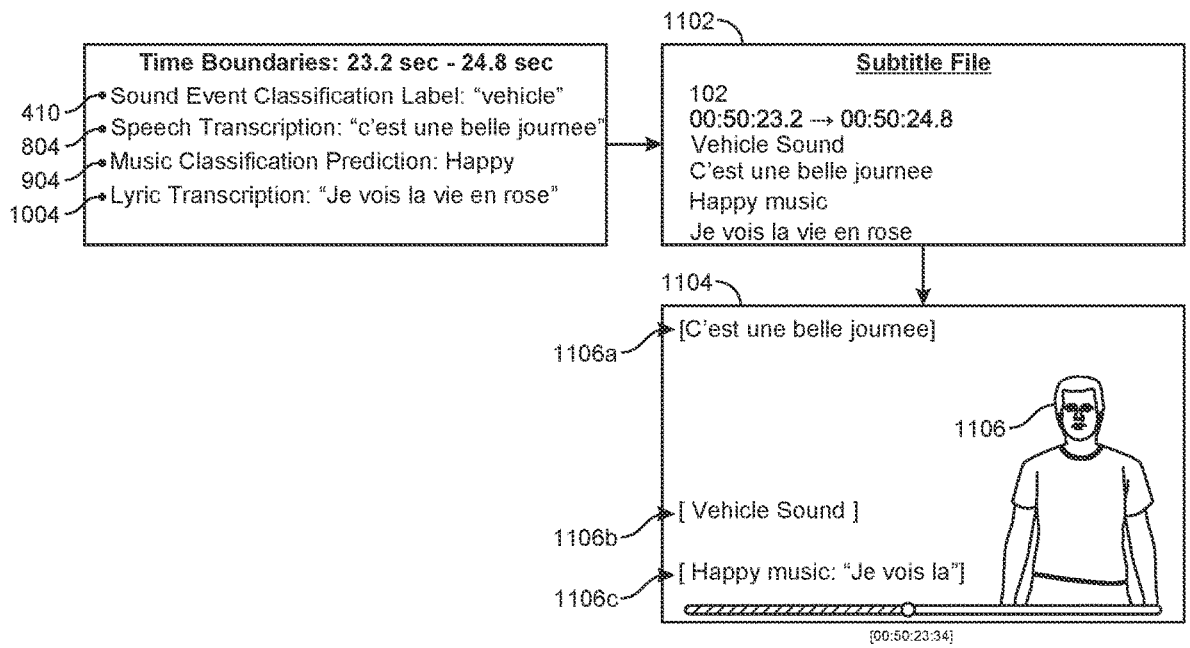
FIG. 11 is a diagram of the comprehensive subtitle system translating subtitle information into digital video display metadata and maintaining the digital video display metadata in accordance with one or more implementations.
Figure 12:
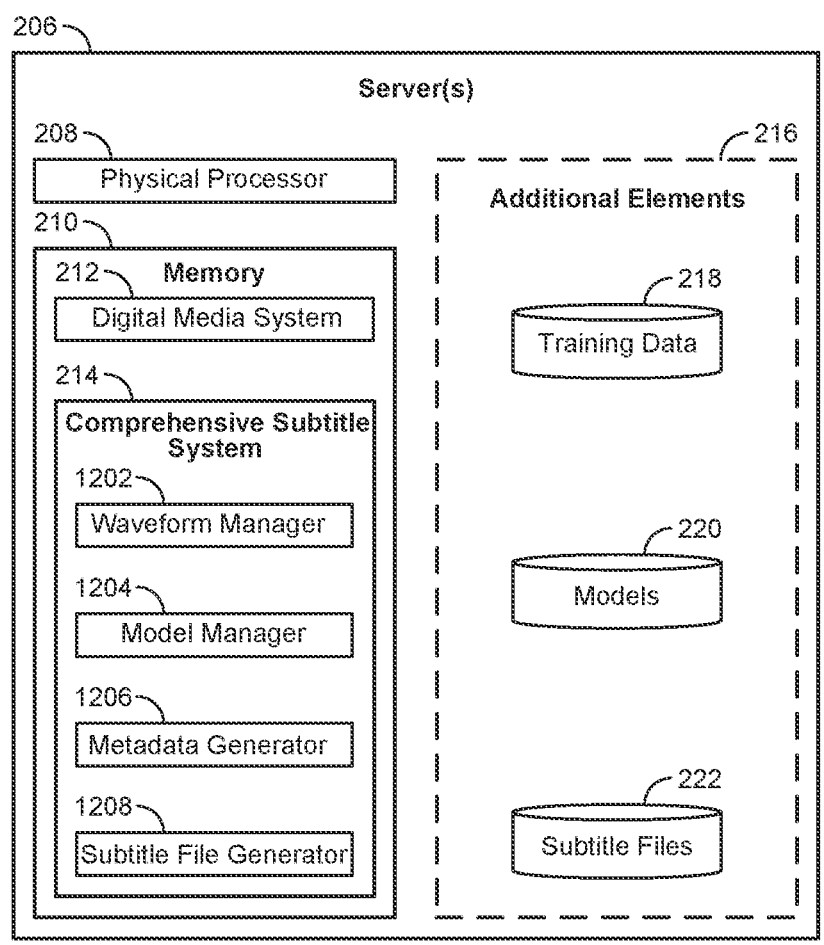
FIG. 12 is a detailed diagram of the comprehensive subtitle system in accordance with one or more implementations.

FIG. 11 shows how the comprehensive subtitle system can generate comprehensive subtitles from the outputs of the computational models included in the various components of the comprehensive subtitle system. For example, FIG. 11 illustrates a sequence diagram of the comprehensive subtitle system translating computational model outputs into digital video display metadata, and then maintaining the digital video display metadata in association with a digital video before providing digital video subtitles based on the digital video display metadata during digital video playback. FIG. 12 is a detailed diagram of the components of the comprehensive subtitle system.

As mentioned above, FIG. 1 is a flow diagram of an exemplary computer-implemented method 100 for generating digital video display metadata for automatically detecting sound events in a soundtrack of a digital video. For example, the method 100 can include generating subtitles based on digital video display metadata associated with detected sound events within the digital video soundtrack. The method 100 may also include displaying the generated subtitles at playback positions corresponding to the sound events within the digital video associated with the digital video soundtrack. The steps shown in FIG. 1 may be performed by any suitable computer-executable code and/or computing system, including the system(s) illustrated in FIG. 12 (e.g., a comprehensive subtitle system). In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may identify an input audio waveform from a soundtrack of a digital video. For example, the comprehensive subtitle system can identify an input audio waveform in any suitable way. In more detail, the comprehensive subtitle system may identify the input audio waveform from a preconfigured file. To illustrate, the comprehensive subtitle system can identify an input audio waveform from a digital video file that includes both digital video visual data and soundtrack audio data. As such, the comprehensive subtitle system can extract the soundtrack audio data from the digital video file for further processing.

Additionally, the comprehensive subtitle system can identify an input audio waveform from a repository of input audio waveforms. For example, the comprehensive subtitle system can request waveforms associated with a particular digital video from a system or service that collects digital video soundtracks to generate waveforms based on the digital video soundtracks. The comprehensive subtitle system can receive the requested waveforms and then cycle through processing each waveform as illustrated in FIG. 1.

In one or more implementations, the comprehensive subtitle system can identify an input audio waveform as a portion of a larger soundtrack. Alternatively, an input audio waveform can include all of a digital video soundtrack. Moreover, in some implementations, a digital video soundtrack may be multi-channeled. Accordingly, in some implementations, the comprehensive subtitle system may identify the input audio waveform by determining one or more channels of the digital video soundtrack and extracting a portion of the one or more channels between a starting timestamp and an ending timestamp.

In one or more implementations, the comprehensive subtitle system can identify the input audio waveform in any suitable format. For example, the comprehensive subtitle system can identify an input audio waveform as a separate audio file (e.g., a .WAV file, a .MP3 file). Additionally, the comprehensive subtitle system can identify the input audio waveform within a digital video file (e.g., a .MP4 file, a .MOV file, a .wmv file). As such, the comprehensive subtitle system can identify the input audio waveform as part of a compressed or uncompressed file in any suitable format.

As further illustrated in FIG. 1, at step 104 the comprehensive subtitle system can apply a sound event classification model to the input audio waveform to detect one or more sound events within the input audio waveform in step 106 and generate sound event classification labels and sound event time boundaries for the one or more sound events in step 108. For example, as discussed further below with regard to FIG. 5, the comprehensive subtitle system may train the sound event classification model to detect sound events within the input audio waveform that include sounds other than speech.

In one or more implementations, the comprehensive subtitle system can train the sound event classification model with automatically or manually generated training data. To illustrate, the comprehensive subtitle system can generate the sound event classification model by applying the sound event classification model to a training input, comparing the output of the sound event classification model to a ground truth corresponding to the training input, then back-propagating the result of the comparison through the sound event classification model. By repeating this training cycle many times, the comprehensive subtitle system can improve the accuracy of the sound event classification model in detecting sound events within input audio waveforms that the comprehensive subtitle system has not yet encountered.

Once trained, the comprehensive subtitle system can apply the sound event classification model to unknown input audio waveforms to detect and classify sound events that may add context and plot information to subtitles for digital video scenes. For instance, the sound event classification model can generate sound event classification labels that classify detected sound events generally (e.g., "car sounds") and/or specifically (e.g., "brakes squealing"). Moreover, the sound event classification model further generates sound event time boundaries that can include starting playback timestamps and ending playback timestamps for each detected sound event. As discussed further below, the comprehensive subtitle system can apply the sound event classification model to input audio waveforms to detect and classify sound events such as, but not limited to: gunshots, car engines, door knocks, breaking glass, animal sounds, and so forth.

As further shown in FIG. 1, at step 110 the comprehensive subtitle system can translate the sound event classification labels into digital video display metadata describing the one or more sound events. For example, the comprehensive subtitle system can translate the sound event classification labels in any suitable way. To illustrate, in some implementations the comprehensive subtitle system can translate the sound event classification labels into digital video display metadata suitable for insertion in a specifically formatted subtitle file. For instance, in some implementations, the comprehensive subtitle system can translate the sound event classification labels into metadata for insertion into a subtitle file (e.g., a SubRip Caption file) that is separate from but associated with a digital video. Additionally, the comprehensive subtitle system can translate the sound event classification labels into any suitable digital video display metadata.

Moreover, in some implementations the comprehensive subtitle system can translate the sound event classification labels into digital video display metadata suitable for embedding directly into the digital video. For example, the comprehensive subtitle system can translate the sound event classification labels into metadata header information associated with a digital video. In additional implementations, the comprehensive subtitle system can translate the sound event classification labels into display data that can be inserted into digital video frames as pixels.

Additionally, at step 112 the comprehensive subtitle system can maintain the digital video display metadata in association with the digital video for playback within the digital video corresponding to the sound event time boundaries. For example, the comprehensive subtitle system can maintain the digital video display metadata in any suitable way. To illustrate, in some implementations the comprehensive subtitle system can insert the now-formatted digital video display metadata into a subtitle file at a position corresponding to the sound event time boundaries for selectively displayed subtitles associated with the digital video. The comprehensive subtitle system can then store the subtitle file in association with the digital video such that a streaming service may provide the subtitle file along with the digital video when the digital video is requested by a user.

Furthermore, in some implementations the comprehensive subtitle system can maintain the digital video display metadata by directly embedding the digital video display metadata as subtitles within the digital video. For example, the comprehensive subtitle system can generate visual data (e.g., pixels) based on the digital video display metadata. The comprehensive subtitle system can then embed the visual data into the digital video as non-selectively displayed subtitles at playback positions corresponding to the sound event time boundaries.

In one or more implementations, the methods and acts performed by the comprehensive subtitle system reference multiple terms. For example, in some implementations the term "digital video" can refer to digital media including visual and audio elements. In one or more implementations, a digital video can be stored in computer memory, streamed over a computer network, and played by a digital media player. In additional implementations, a digital video can be stored and/or transmitted in any format (e.g. MP4, MOV, AVI, WMV). Accordingly, as used herein, the term "playback" can refer to a digital media player providing the visual and audio elements of a digital video for viewing and/or listening on a display device (e.g., a TV, a laptop, a tablet, a smart phone). It follows that a digital media player may read and playback digital videos in any of a variety of digital video formats.

As used herein, the term "soundtrack" can refer to the audio or auditory elements of a digital video. For example, the soundtrack of a digital video can include one or more channels of acoustic sounds converted to digital audio data. A soundtrack can include audio data that conveys spoken language, music and lyrics, and sound events. In one or more implementations, a soundtrack can be part of a multimedia file that includes audio and video—such as with a complete digital video file. In additional implementations, a soundtrack can be in a separate file from the visual information associated with a digital video.

As used herein, the term "subtitle" can refer to written text describing sounds. For example, a subtitle can include transcribed text of spoken words. A subtitle can be overlaid on frames of a digital video. For example, in one implementation, subtitle information may be stored in an auxiliary file associated with a digital video. During playback of the digital video, the digital media player may access the auxiliary file, read out the subtitle information, and display subtitles based on the subtitle information overlaid on frames of the digital video during playback. Additionally or alternatively, subtitles may be directly embedded into frames of a digital video. In those implementations, the subtitles are always displayed during playback of the digital video and may not be toggled on and off.

As used herein, the term "input audio waveform" may refer to audio data taken from a portion of a digital video soundtrack. For example, an input audio waveform may include all of the sounds from a digital video soundtrack from between starting and ending timestamps. An input audio waveform may include a single channel or multiple channels.

As used herein, the term "sound event" may refer to any sound within a soundtrack other than speech. For example, sound events may result from human actions (e.g., coughs, sneezes, footsteps, hands clapping), machines (e.g., car engines, air conditioners blowing, guns firing), animals (e.g., dogs barking, birds calling), nature (e.g., rain falling, wind blowing), or any other entity that can produce sound.

As used herein, the term "digital video display metadata" can refer to information describing subtitle data generated by one or more models. For example, in one implementation, digital video display metadata can include one or more labels and associated time boundaries associated with speech, music, and/or sound events detected within an input audio waveform. In at least one implementation, digital video display metadata can be specifically formatted. For example, digital video display metadata can be formatted according to the requirements of a SubRip Subtitle (SRT) file.

As referred to throughout, the comprehensive subtitle system may train and utilize one or more computational models. In one or more implementations, as used herein, a computational model simulates complex thought in order to generate one or more predictions. For example, a computational model can generate a classification prediction, a language prediction, a sound event prediction, and so forth. Additionally, computational models can include playback time boundaries (e.g., playback positions within a digital video soundtrack) associated with each type of prediction. Computational models can include artificial neural networks (e.g., convolutional neural networks, recurrent neural networks, long short-term memory networks), decision trees, decision fields, algorithms, and so forth.

As mentioned above, FIG. 2 includes a diagram of an environment 200 implementing aspects of the present disclosure. For example, the network environment 200 can include client computing devices 202a-202n as well as server(s) 206. In one or more implementations, the client computing devices 202a-202n may be communicatively coupled to the server(s) 206 through a network 224. The network 224 may represent any type or form of communication network, such as the Internet, and may comprise one or more physical connections, such as a LAN, and/or wireless connections, such as a WAN.

In more detail, in one or more implementations, the server(s) 206 can include a physical processor 208, a memory 210, and additional elements 216. For example, the memory 210 may be installed with a digital media system 212, and a comprehensive subtitle system 214. Furthermore, the additional elements 216 may include training data 218, model data 220, and subtitle files 222.

In one or more implementations, the digital media system 212 can include a networked digital media service that provides or streams digital media to users. For example, in one embodiment, the digital media system 212 can stream digital media (e.g., digital videos, digital video games) over the network 224 to one or more of the client computing devices 202a-202n. As shown in FIG. 2, each of the client computing devices 202a-202n may include digital media players 202a-202n, respectively. Accordingly, users of the client computing devices 202a-202n may watch and otherwise interact with the streamed digital media via the digital media player 202a-202n.

In some implementations, the users of the client computing devices 202a-202n may be deaf, hard of hearing, or may desire to watch streamed digital media without sound. Accordingly, as mentioned above and as described in greater detail below, the comprehensive subtitle system 214 can generate comprehensive subtitles corresponding to the soundtrack of a digital video. For example, the comprehensive subtitle system 214 can utilize the training data 218 and the model data 220 to train various computational models. The comprehensive subtitle system 214 can further utilize the model data 220 to generate subtitle files 222 in order to provide subtitle information along with a streamed digital video. In one or more implementations, the digital media players 204a-204n installed on the client computing devices 202a-204n may access this subtitle information during playback of the digital video to display comprehensive subtitles to the user.

As shown in FIG. 2 and as mentioned above, the server(s) 206 can include one or more physical processors, such as the physical processor 208. The physical processor 208 generally represents any type or form of hardware-implemented processing unit capable of interpreting and/or executing computer-readable instructions. In one embodiment, the physical processor 208 may access and/or modify one or more of the components of the comprehensive subtitle system 214. Examples of physical processors include, without limitation, microprocessors, microcontrollers, Central Processing Units (CPUs), Field-Programmable Gate Arrays (FPGAs) that implement softcore processors, Application- Specific Integrated Circuits (ASICs), portions of one or more of the same, variations or combinations of one or more of the same, and/or any other suitable physical processor.

Additionally, the memory 210 generally represents any type or form of volatile or non-volatile storage device or medium capable of storing data and/or computer-readable instructions. In one example, the memory 210 may store, load, and/or maintain one or more of the components of the comprehensive subtitle system 214. Examples of the memory 210 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

While FIG. 1 shows the comprehensive subtitle system 214 operating on the server(s) 206 along with the digital media system 212, other arrangements are possible. For example, in additional implementations, the comprehensive subtitle system 214 may reside on a separate server from the digital media system 212. In that implementation, the comprehensive subtitle system 214 may receive a digital video soundtrack from the digital media system 212 on the server(s) 206, generate subtitle data from the soundtrack, and transmit the generated subtitle data back to the digital media system 212. Additionally, although the environment 200 illustrated in FIG. 2 includes a given number of client computing devices and the servers connected by the network 224, other implementations can include any number of computing devices and servers in any arrangement.

As mentioned above, the comprehensive subtitle system 214 can generate comprehensive subtitles for a digital video that provide visual information for every type of sound that may be included in the soundtrack of a digital video. FIG. 3 illustrates a sequence 300 of steps taken by the comprehensive subtitle system 214 in generating comprehensive subtitles for a digital video soundtrack.

As shown in FIG. 3, at a step 302 the comprehensive subtitle system 214 can identify an input audio waveform from a soundtrack of a digital video. For example, in one implementation the comprehensive subtitle system 214 can generate the input audio waveform by determining one or more channels of the soundtrack (e.g., if the soundtrack is multi-channeled) and extracting a portion of the one or more channels between a starting timestamp and an ending timestamp. For instance, the comprehensive subtitle system 214 can extract a five second portion of a channel of a soundtrack as the input audio waveform. In additional examples, the comprehensive subtitle system 214 may identify the input audio waveform from a selection or listing of preconfigured waveforms.

As further shown in FIG. 3, at step 304 the comprehensive subtitle system 214 can generate sound event labels based on the input audio waveform. For example, and as will be discussed in greater detail below with regard to FIG. 4, the comprehensive subtitle system 214 can apply a trained sound event classification model to the input audio waveform. In one or more implementations, the sound event classification model detects sound events within the input audio waveform and classifies the detected sound events under one or more various sound event labels. The sound event classification model can also determine sound event time boundaries of the detected sound events within the input audio waveform. To illustrate, in response to detecting a sound event including a car driving past, the sound event classification model can detect the sound event, classify the sound event as a "moving vehicle," and output the label "moving vehicle" along with the sound event time boundaries for that sound event (e.g., "05:25:34-05:29:02").

Additionally, as shown in FIG. 3, at a step 306 the comprehensive subtitle system 214 can generate waveform segments including music and waveform segments including speech from the input audio segment. For example, and as will be discussed in greater detail below with regard to FIG. 6, the comprehensive subtitle system 214 can apply a speech music activation detection model to the input audio waveform to generate the waveform segments including music and the waveform segments including speech. In one or more implementations, there may be overlap between the waveform segments including music and the waveform segments including speech (i.e., as with people speaking in a restaurant with background music). Despite this, and in additional steps as described below, the comprehensive subtitle system can use the waveform segments including music in connection with music classification and musical lyric detection. Additionally, also described below, the comprehensive subtitle system can use the waveform segments including speech in connection with language detection and speech transcription.

For example, at step 308 the comprehensive subtitle system 214 can begin processing the waveform segments comprising speech. For instance, at step 310 the comprehensive subtitle system 214 can determine a language associated with the waveform segments including speech. To illustrate, and as will be discussed in greater detail below with regard to FIG. 7, the comprehensive subtitle system 214 can apply a language detection model to each of the waveform segments including speech to determine a language that is spoken in each waveform segment including speech. At a step 310, the comprehensive subtitle system 214 can further generate a transcription of the waveform segments including speech based on the determined language associated with each waveform segment including speech. Accordingly, upon completion of step 310, the comprehensive subtitle system 214 may have generated a transcription of the speech in the segment of the input audio waveform in the language(s) demonstrated therein.

Additionally, at step 312 the comprehensive subtitle system 214 can generate musical classifications for the waveform segments including music (e.g., generated in step 306). For example, and as will be discussed in greater detail below with regard to FIG. 9, the comprehensive subtitle system 214 can generate mood-based music classification predictions for each of the waveform segments including music by applying a music classification model to the waveform segments including music. Furthermore, at step 314 the comprehensive subtitle system 214 can generate lyrics for the waveform segments including music by applying a lyric recognition model to the waveform segments including music.

Moreover, as shown in FIG. 3, at step 316 the comprehensive subtitle system 214 can generate comprehensive subtitles for the soundtrack of the digital video based on the outputs generated at each of the steps 306-314. For example, the comprehensive subtitle system 214 can generate the comprehensive subtitles based on one or more of the sound event labels, the speech transcriptions, the music classification predictions, and/or the lyric transcriptions. Furthermore, the comprehensive subtitle system 214 can generate the subtitles including this information based on the time boundaries generated as part of the various outputs of the steps 304, 310, 312, and 314.

In one or more implementations, as demonstrated by FIG. 3, the comprehensive subtitle system 214 can perform steps in both parallel and in sequence in order to optimize the efficiency of the subtitle generation process. For example, as shown in FIG. 3, in at least one implementation, the comprehensive subtitle system 214 can perform the steps 304 and 306 in parallel. The comprehensive subtitle system 214 can further perform the steps 308, 312, and 314 in parallel. In additional implementations, the comprehensive subtitle system 214 can perform the steps 306-314 in a different order or arrangement prior to generating the comprehensive subtitles in the step 316. Additionally, the comprehensive subtitle system can repeat the steps 302-316 with additional input audio waveforms from the soundtrack of the digital video until subtitles are generated for the entire soundtrack.

Figure 4:
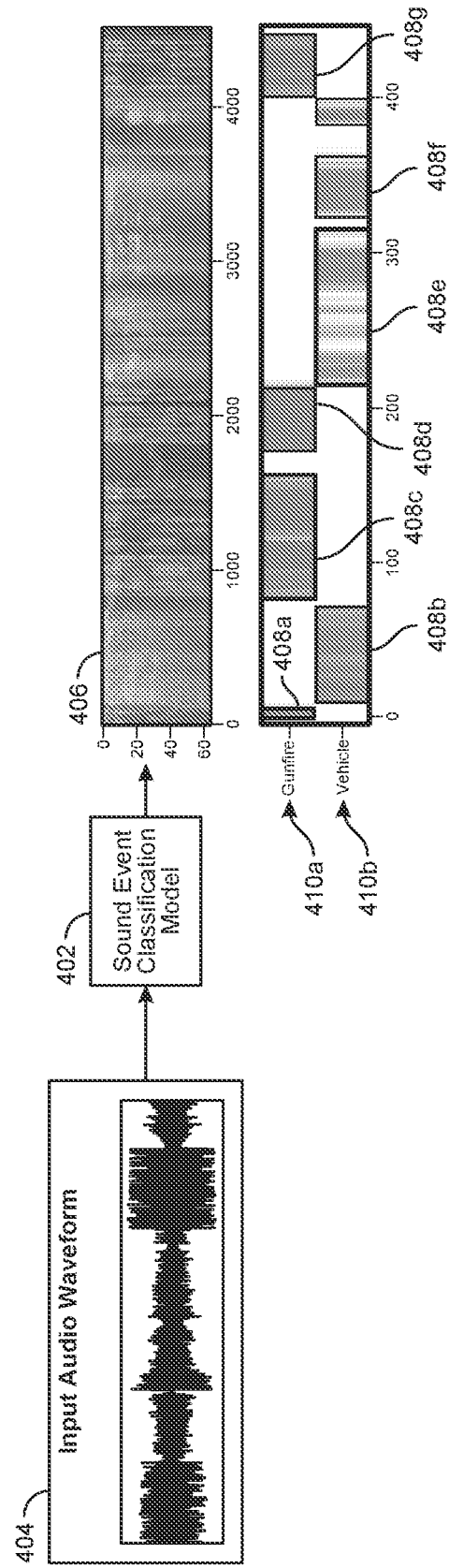
FIG. 4 is a diagram of the comprehensive subtitle system applying a sound event classification model to an input audio waveform to generate sound event classification labels and time boundaries in accordance with one or more implementations.

As mentioned above, in one or more implementations, the comprehensive subtitle system 214 may apply a sound event classification model to an input audio waveform to detect sound events and generate sound event classification labels and sound event time boundaries for the sound events. FIG. 4 illustrates a diagram of the comprehensive subtitle system 214 applying a sound event classification model 402 to an input audio waveform 404 to generate sound event classification labels and sound event time boundaries for sound events detected in the input audio waveform 404.

In at least one implementation and as shown in FIG. 4, the comprehensive subtitle system 214 can apply the sound event classification model 402 to the input audio waveform 404 to generate various outputs. For example, the sound event classification model 402 can generate a stabilized log mel spectrogram 406 representing the input audio waveform 404. To illustrate, the sound event classification model 402 can use a fast Fourier transform to map the audio signal of the input audio waveform 404 from a time domain to a frequency domain. Additionally, the sound event classification model 402 can convert the y-axis of the Fourier transform to a log scale and the color dimension of the Fourier transform to decibels; thereby forming a spectrogram. Moreover, the sound event classification model 402 can further map the y-axis representing frequency to the mel scale to form the log mel spectrogram 406. In at least one implementation, the mel scale represents a unit of pitch where equal distances in pitch sound equally distant to a listener.

Additionally, as further shown in FIG. 4, the sound event classification model 402 can utilize the stabilized log mel spectrogram 406 to detect one or more sound events within the input audio waveform represented by the stabilized log mel spectrogram 406. For example, the sound event classification model 402 can detect sound events based on the color and density of represented data within the stabilized log mel spectrogram 406 at various stabilized frequencies. To illustrate, a dense cluster of a certain color of data that is at a stabilized frequency audible to human hearing can indicate to the sound event classification model 402 that a sound event has occurred at the corresponding timestamp within the input audio waveform 404.

Accordingly, in response to detecting one or more sound events, the sound event classification model 402 can generate sound event classification labels 410*a*, 410*b* and corresponding sound event time boundaries 408*a*-408*g* for each of the detected sound events. For example, based on its training, the sound event classification model 402 can generate the sound event classification labels 410*a*, 410*b* in response to predicting that the detected sound events include gunfire and vehicle sounds. Additionally, the sound event classification model 402 can generate the sound event time boundaries 408*a*-408*g* for the different classifications of sound events over time within the input audio waveform 404. In at least one implementation, the sound event classification model 402 can generate the sound event time boundaries 408*a*-408*g* such that the darker color within each time boundary indicates the higher probability for the corresponding sound event. In at least one implementation, the sound event classification model 402 can generate outputs including a listing of sound events including a classification and time boundaries, such as, "Gunfire: 00:00:00-00:00:10," "Vehicle: 00:00:12-00:00:58," etc.

Figure 5:
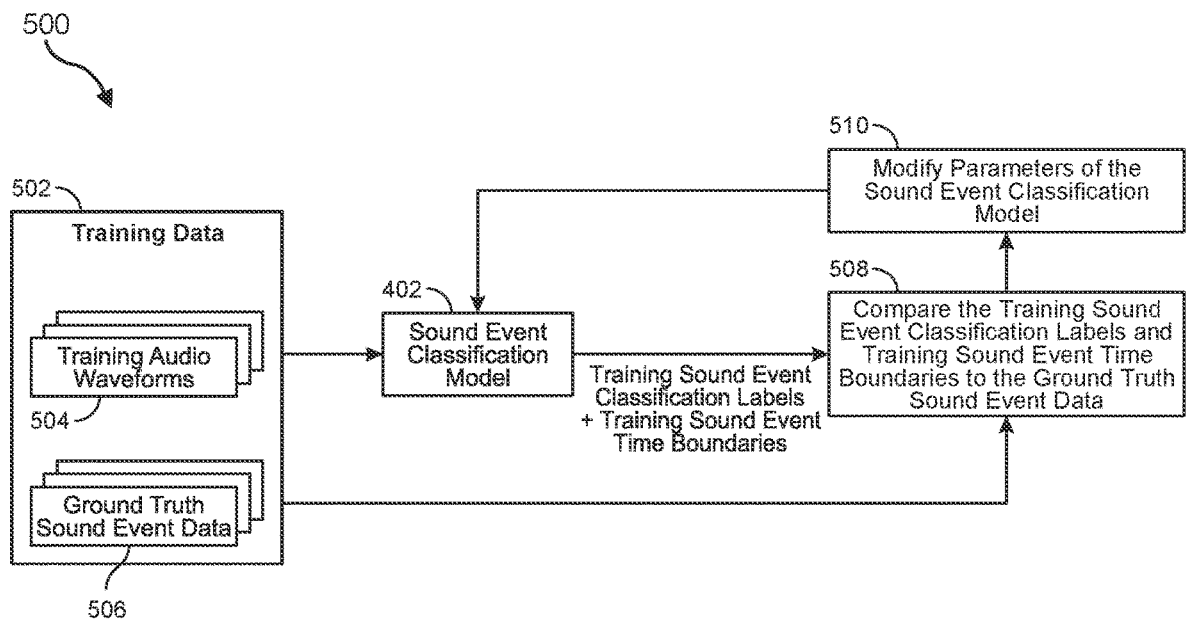
FIG. 5 is a diagram of the comprehensive subtitle system training the sound event classification model in accordance with one or more implementations.

As mentioned above, the comprehensive subtitle system 214 can train the sound event classification model 402 to generate sound event classification labels and sound event time boundaries. FIG. 5 illustrates a flow diagram of an exemplary computer-implemented method 500 for training the sound event classification model 402 to generate these outputs. In one or more implementations, the comprehensive subtitle system 214 can engage in supervised learning using weakly labeled data to generate and train the sound event classification model 402.

In one or more implementations, the sound event classification model 402 can be a computational model in any of a variety of formats or configurations. For example, in one implementation, the sound event classification model 402 can be a deep neural network featuring convolutional architecture. In at least one implementation, the sound event classification model 402 can include a feature extraction layer, multiple hidden layers, and an output layer. For instance, in at least one implementation, the sound event classification model 402 can include a deep learning model featuring depthwise-separable convolution architecture that can be trained utilizing a feed-forward back propagation approach.

For example, in a step 502 the comprehensive subtitle system 214 can generate or otherwise identify training data including training audio waveforms 504 and corresponding ground truth sound event data 506. To illustrate, a training audio waveform 504 can include one or more channels of a portion of a digital video soundtrack. Additionally, the ground truth sound event data 506 corresponding to that training audio waveform 504 can include sound event classification labels for sound events within the training audio waveform 504 along with the sound event time boundaries indicating playback positions for each of the sound events within the training audio waveform 504. In some implementations, the training data may include weakly labeled training data such as, for example, training audio waveforms without corresponding training sound event time boundaries.

Accordingly, the comprehensive subtitle system 214 can train the sound event classification model 402 by iteratively applying the sound event classification model 402 to the training audio waveforms 504. For example, at a step 508 and after applying the sound event classification model 402 to a training audio waveform 504, the comprehensive subtitle system 214 can compare the training sound event classification labels and training sound event time boundaries generated by the sound event classification model 402 to the ground truth sound event data 506 corresponding to the training audio waveform 504.

To illustrate, in one implementation, the comprehensive subtitle system 214 may compare the training sound event classification labels and training sound event time boundaries to the ground truth sound event data 506 for an exact match. In additional implementations, the comprehensive subtitle system 214 can compare the training sound event classification labels and training sound event time boundaries to the ground truth sound event data 506 for a near-match within a predetermined tolerance.

As further shown in FIG. 5, at a step 510 the comprehensive subtitle system 214 can modify parameters of the sound event classification model 402 based on the comparison performed in the step 508. For example, as mentioned above and utilizing a feed-forward back propagation approach, the comprehensive subtitle system 214 can modify weights and other parameters across nodes within one or more layers of the sound event classification model 402.

In one or more implementations, the comprehensive subtitle system 214 can continue to iteratively perform the steps 508 and 510 with additional pairs of training audio waveforms 504 and corresponding ground truth sound event data 506. For example, in one implementation, the comprehensive subtitle system 214 can repeat the steps 508 and 510 until the training cycles converge. In other words, the comprehensive subtitle system 214 can repeat steps 508 and 510 until comparisons in step 508 indicate little to no error in the comparisons between outputs of the sound event classification model 402 and the ground truth sound event data over a threshold number of training cycles. In one or more implementations, the comprehensive subtitle system 214 can periodically retrain the sound event classification model 402 in the same manner discussed above with regard to FIG. 6.

As mentioned above, the sound event classification model 402 can classify detected sound events within a predetermined ontology. For example, in one or more implementations the comprehensive subtitle system 214 can generate the ontology based on training data used to train the sound event classification model 402 (e.g., the training audio waveform 504 and the ground truth sound event data 506).

To illustrate, in one implementation, the comprehensive subtitle system 214 can generate the training data from manually generated subtitles maintained by the digital media system 212. In parallel, the comprehensive subtitle system 214 can determine the top N number of most frequent sound event tags within the manually generated subtitles. The comprehensive subtitle system 214 can further organize the top N number of most frequent sound event tags into sound event classes, such that the resulting ontology includes the sound event classes of corresponding sound event tags describing specific sounds. For example, the comprehensive subtitle system 214 may generate an ontology with a sound event class, "mouth sounds," including sound event tags: "[sighs], [laughs], [screaming], [scoffs], [chuckles], [echoing], [grunts], [panting], [screams], [whispers], [clears throat], [crying softly], [yells], and [groaning]/[groans]."

As discussed above with regard to FIG. 3 and in addition to generating sound event subtitles, the comprehensive subtitle system 214 can generate comprehensive subtitles directed to all sounds within the soundtrack of a digital video. In one or more implementations, to increase the speech and efficiency of this process, the comprehensive subtitle system comprehensive subtitle system 214 can perform additional subtitle generation activities both in parallel and in sequence. For example, in at least one implementation, the comprehensive subtitle system 214 determines portions of an input audio waveform that contain speech and portions of the input audio waveform that contain music in parallel with the generating sound event labels (e.g., in the process discussed above with regard to FIGS. 4 and 5.

Figure 6:
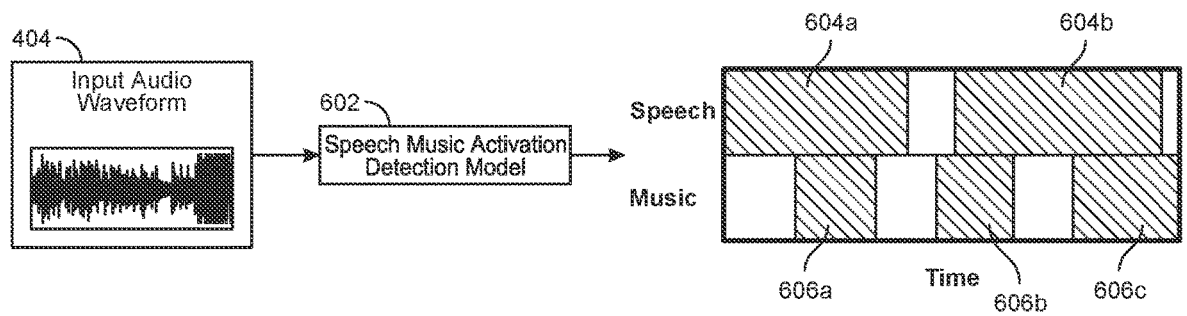
FIG. 6 is a diagram of the comprehensive subtitle system applying a speech music activation detection model to an input audio waveform to generate waveform segments comprising speech and waveform segments comprising music in accordance with one or more implementations.

FIG. 6 illustrates a diagram of the comprehensive subtitle system 214 applying a speech music activation detection model 602 to the input audio waveform 404 (i.e., the same input audio waveform 404 to which the comprehensive subtitle system 214 applied the sound event classification model 402 as shown in FIG. 4). For example, the comprehensive subtitle system 214 can apply the speech music activation detection model 602 to the input audio waveform 404 to generate waveform segments comprising speech 604a, 604b, and waveform segments comprising music 606a, 606b, and 606c.

In one or more embodiments, the speech music activation detection model 602 can be a machine learning model that receives the input audio waveform 404, extracts one or more features of the input audio waveform 404, and processes the one or more features across any number of layers including any number of nodes in order to generate the waveform segments comprising speech 604a-604b and the waveform segments comprising music 606a-606c. In at least one implementation, each of the waveform segments 604a-604b and the waveform segments 606a-606c include a portion of the input audio waveform 404 between a starting timestamp and an ending time stamp. In some implementations, as further shown in FIG. 6, some portions of the input audio waveform 404 may include both speech and music. In those implementations, the speech music activation detection model 602 can generate a waveform segment comprising speech 604 and a waveform segment comprising music 606 both associated with overlapping timestamps.

Figure 7:
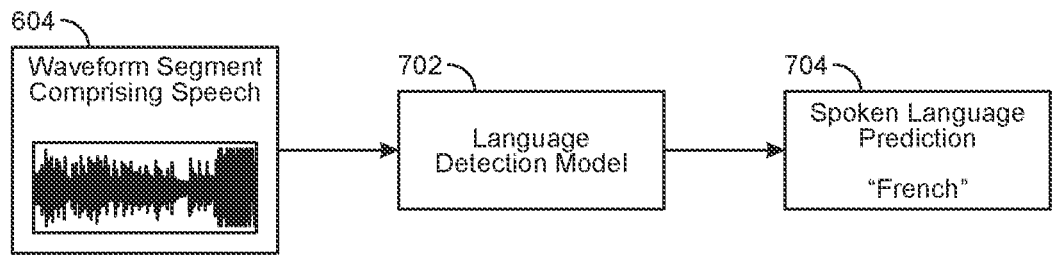
FIG. 7 is a diagram of the comprehensive subtitle system applying a language detection model to a waveform segment comprising speech to generate a spoken language prediction in accordance with one or more implementations.

As mentioned above, the comprehensive subtitle system 214 can utilize the waveform segments comprising speech 604a-604b and the waveform segments comprising music 606a-606c to further generate subtitles directed to speech and music within the input audio waveform 404. For example, FIG. 7 illustrates a diagram of the comprehensive subtitle system 214 applying a language detection model 702 to one or more of the waveform segments comprising speech 604. In one or more implementations, the language detection model 702 is a machine learning model trained to detect a language associated with speech within a waveform segment. Accordingly, the comprehensive subtitle system 214 can apply the language detection model 702 to the waveform segment comprising speech 604 to generate a spoken language prediction 704.

Figure 8:
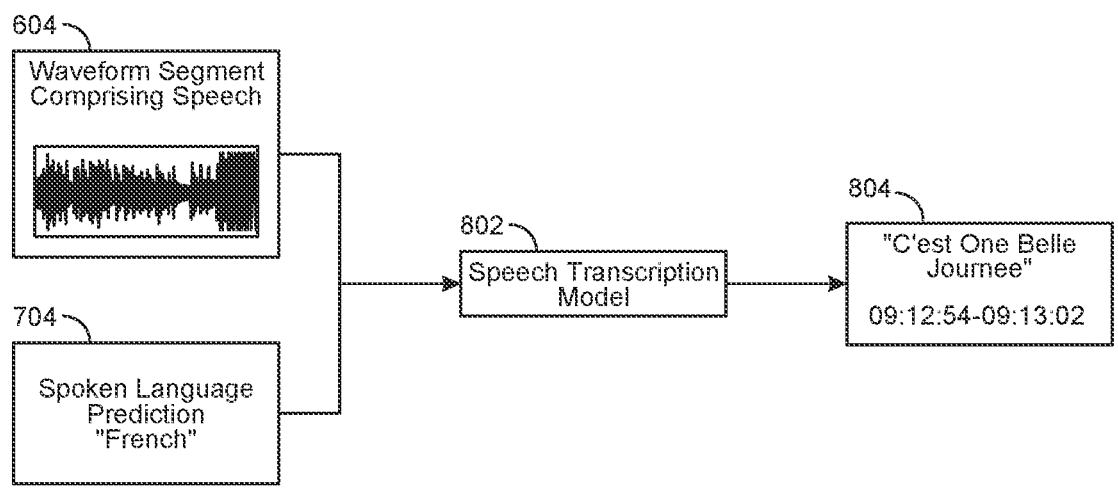
FIG. 8 is a diagram of the comprehensive subtitle system applying a speech transcription model to a waveform segment comprising speech to generate speech transcriptions in accordance with one or more implementations.

Additionally, as shown in FIG. 8, the comprehensive subtitle system 214 can further generate subtitle data for each of the waveform segments comprising speech 604 based on the language(s) determined by the language detection model 702. For example, the comprehensive subtitle system 214 can apply a speech transcription model 802 to the waveform segment comprising speech 604 in combination with the spoken language prediction 704 to generate a speech transcription 804. In at least one implementation, the speech transcription 804 can include text of the speech transcription as well as speech time boundaries for the speech transcription.

In one or more implementations, the speech transcription model 802 may be a machine learning algorithm trained against known digital video dialog and dialog transcriptions across multiple languages. In at least one implementation, the comprehensive subtitle system 214 may iteratively apply the speech transcription model 802 to each of the waveform segments comprising speech 604 in combination with each of their associated spoken language predictions 704. In that implementation, the speech transcription model 802 can output accurate subtitle text (and associated time boundaries) even though multiple languages may be spoken within the input audio waveform 404.

As mentioned above, the score of a digital video or other digital media can add both complex and nuanced emotional components to a viewer's experience. Accordingly, the comprehensive subtitle system 214 can generate subtitle information directed to a classification or mood associated with music within an input audio waveform 404. For example, as shown in FIG. 9, the comprehensive subtitle system 214 can apply a music classification model 902 to waveform segments comprising music 606 to generate one or more music classification predictions 904a, 904b and associated music classification time boundaries for the music classification predictions 904a, 904b.

In more detail, in one or more implementations the music classification model 902 may be a convolutional neural network trained for music classification. For example, in one implementation, the music classification model 902 may be a convolutional neural network that is multiple layers deep. The layers of the music classification model 902 may include layers with learnable weights, convolutional layers, pooling layers, and fully connected layers. In one implementation, the music classification model 902 includes alternating convolutional and maxpool layers that increase in depth over 10 layers before passing outputs through 3 sequential softmax layers to generate one or more music classification predictions.

Figure 9:
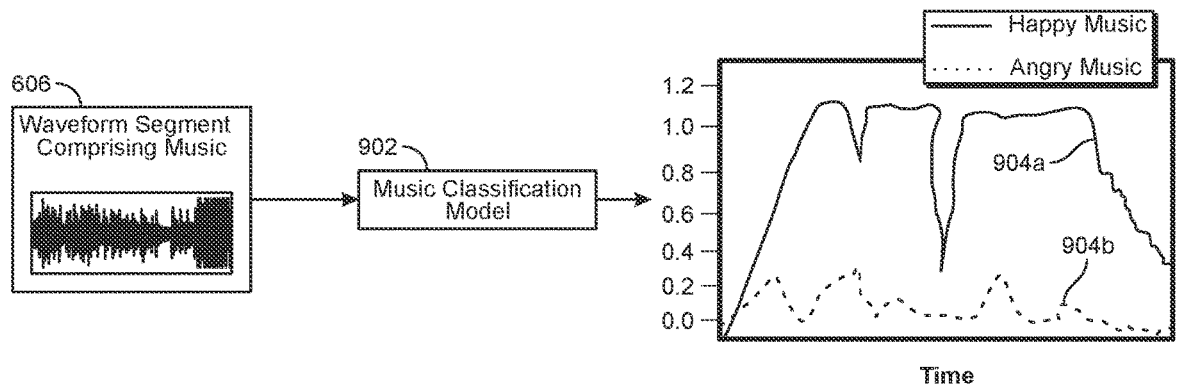
FIG. 9 is a diagram of the comprehensive subtitle system applying a music classification model to a waveform segment comprising music to generate music classification predictions and time boundaries in accordance with one or more implementations.

As shown in FIG. 9, the music classification model 902 can output music classification predictions 904a-904b in a chart indicating probabilities associated with each classification over the input audio waveform timestamps represented by the waveform segment comprising music 606. For example, as shown, the music classification model 902 can output a chart indicating that most of the music within the waveform segment comprising music 606 is predicted to be "happy music," while "angry music" is predicted to be briefly featured toward the middle of the waveform segment comprising music 606.

Moreover, the chart of music classification predictions 904a-904b also indicates the music classification time boundaries for the music classification predictions 904a-904b. For example, in one implementation, the comprehensive subtitle system 214 can determine that the music classification time boundaries for a music classification prediction exist where a certainty level for that prediction is above a predetermined certainty threshold (e.g., above the 0.8 certainty threshold). In additional implementations, the comprehensive subtitle system 214 can determine that the music classification time boundaries for a music classification prediction exist where that prediction is higher within the chart than other music classification predictions.

In one or more implementations, the comprehensive subtitle system 214 can train the music classification model 902 to generate music classification predictions associated with multiple music classes. For example, in one implementation, the comprehensive subtitle system 214 may train the music classification model 902 to generate music classifications predictions within music classes including, but not limited to, "happy music," "funny music," "sad music," "tender music," "exciting music," "angry music," and "scary music."

In at least one implementation, the comprehensive subtitle system 214 can also train the music classification model 902 to utilize digital video frames in generating music classification predictions. For example, the comprehensive subtitle system 214 can further generate the music classification model 902 to utilize a training digital video frame along with a training waveform segment comprising music to generate a music classification prediction. The comprehensive subtitle system 214 can then apply the trained music classification model 902 to unknown waveform segments comprising music and associated digital video frames to generate music classification predictions and associated music classification time boundaries. Additional information regarding the music classification model 902 may be found in U.S. application Ser. No. 17/841,322, entitled "SYSTEMS AND METHODS FOR CLASSIFYING MUSIC FROM HETEROGENOUS AUDIO SOURCES," the entirety of which is incorporated herein by reference.

Figure 10:
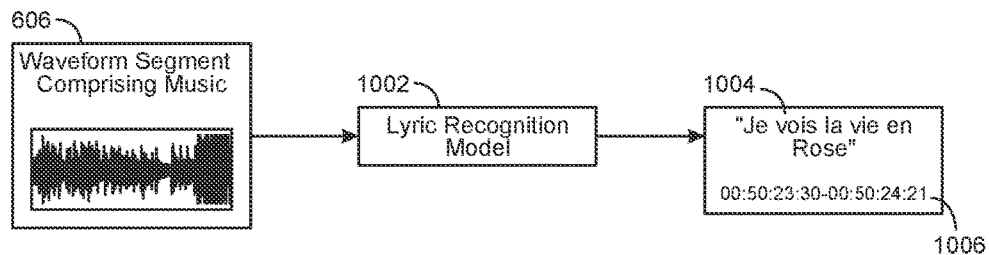
FIG. 10 is a diagram of the comprehensive subtitle system applying a lyric recognition model to a waveform segment comprising music to generate lyric transcriptions and time boundaries in accordance with one or more implementations.

Additionally, in one or more embodiments, the comprehensive subtitle system 214 can further generate subtitles directed to song lyrics. For example, some waveform segments comprising music 606 may include songs with both music and sung speech (e.g., lyrics). Accordingly, as shown in FIG. 10, the comprehensive subtitle system 214 can apply a lyric recognition model 1002 to the waveform segment comprising music to generate lyric transcriptions 1004 as well as lyric time boundaries 1006.

As mentioned above, the comprehensive subtitle system 214 can translate subtitle information generated by one or more of the models described above into digital video display metadata. Additionally, the comprehensive subtitle system 214 can maintain the digital video display metadata corresponding to a soundtrack in association with the digital video from which the soundtrack originated. FIG. 11 illustrates the comprehensive subtitle system 214 translating the subtitle information into digital video display metadata and maintaining that digital video display metadata.

In more detail, as a result of one or more the parallel and serial processes discussed above with reference to FIGS. 3-10, the comprehensive subtitle system 214 can identify the generated subtitle data. For example, the comprehensive subtitle system 214 can identify the one or more sound event classification labels 410, one or more speech transcriptions 804, one or more music classification predictions 904, and/or one or more lyric transcriptions 1004. The comprehensive subtitle system 214 can further determine time boundaries (e.g., "23.2 sec-24.8 sec") associated with the identified subtitle information. In at least one implementation, these time boundaries correspond to the starting and ending timestamps of the input audio waveform used to generate the subtitle information.

In one or more implementations, as shown in FIG. 11, the comprehensive subtitle system 214 translates the subtitle information based on various subtitle file types. For example, in one implementation, the comprehensive subtitle system 214 can translate the subtitle information into digital video display metadata based on a SubRip Caption (SRT) file type. To illustrate, in some implementations a subtitle file 1102 can be a flat file that includes digital video display metadata in a predetermined order. For instance, a subtitle file can include multiple lines of information in sequence for every subtitle in a digital video. The lines of digital video display metadata can include 1) a number of the subtitle in the sequence of subtitles for the digital video; 2) beginning and ending timecodes for when the one or more subtitles should appear overlaid on the digital video; 3) the text of the one or more subtitles; and 4) a blank line indicating the star of a new subtitle. During playback of the digital video, the digital media player can read out the subtitle information from the subtitle file 1102 in sequence according to the beginning and ending timecodes associated with the subtitles.

Accordingly, the comprehensive subtitle system 214 can translate the generated subtitle information into formatted digital video display metadata for each label, transcription, and/or prediction. For example, the comprehensive subtitle system 214 can translate a sound event classification label 410 into digital video display metadata by determining a sequence number for the sound event classification label 410 based on the sound event time boundaries associated with that sound event classification label in light of existing contents of the subtitle file.

The comprehensive subtitle system 214 can further enter the sequence number, the sound event time boundaries, and the sound event classification label into the subtitle file at an insertion point in the subtitle file 1102 corresponding to the sequence number. In at least one implementation, the comprehensive subtitle system 214 can further update other sequence numbers in the subtitle file 1102 if the insertion point was between two pre-existing sequence numbers. The comprehensive subtitle system 214 can repeat this process with any additional speech transcriptions 804, music classification predictions 904, and lyric transcriptions 1004 based on the associated speech time boundaries, music classification time boundaries, and lyric time boundaries, respectively. If a transcription, prediction, or label shares time boundaries with other digital video display metadata the in the subtitle file 1102, the comprehensive subtitle system 214 can add the text of the transcription, prediction, or label to the pre-existing digital video display metadata at that insertion point.

In one or more implementations, the comprehensive subtitle system 214 can maintain the digital video display metadata within the subtitle file by associating the subtitle file with the digital video from which the soundtrack originated. For example, as shown in FIG. 2, the comprehensive subtitle system 214 can maintain the subtitle file in the repository of subtitle files 222 with a label, pointer, or other indication of the digital video. Accordingly, when the digital media system 212 streams the digital video to one or more users, the digital media system 212 can also provide the subtitle file associated with the digital video.

In additional implementations, the comprehensive subtitle system 214 can translate the generated subtitle information into digital video display metadata by generating embeddable subtitles based on the subtitle information. For example, the comprehensive subtitle system 214 can generate a subtitle including the text of the label, transcription, and/or prediction and associate the subtitle with the corresponding time boundaries. The comprehensive subtitle system 214 can then maintain this digital video display metadata by embedding the generated subtitles directly into the digital video based on the corresponding time boundaries.

Based on any of the methods of maintaining the digital video display metadata, the digital media player 204 on a client computing device 202 can display subtitles based on the maintained digital video display metadata. For example, as shown in FIG. 11, the digital media player 204 can display subtitles 1106a, 1106b, and 1106c based on the digital video display metadata in the subtitle file 1102 during playback of the digital video within a digital media player window 1104 (e.g., on a display of the client computing device 202). In some implementations, as with embedded subtitles, the digital media player 204 may not be able to reorder, resize, or reposition the subtitles. In other implementations, as with the subtitle file 1102, the digital media player 204 may be able to reorder, resize, or reposition the subtitles based on positions of other items 1106 displayed within the digital media player window 1104.

As mentioned above, FIG. 12 is a block diagram of the comprehensive subtitle system 214 operating on the server(s) 206. The comprehensive subtitle system 214 can perform many functions in connection with generating comprehensive subtitles directed to sound events and other types of sound within a digital video soundtrack. Accordingly, FIG. 12 provides additional detail with regard to these functions. For example, as shown in FIG. 12, the comprehensive subtitle system 214 can include a waveform manager 1202, a model manager 1204, a metadata generator 1206, and a subtitle file generator 1208.

In certain implementations, the comprehensive subtitle system 214 may represent one or more software applications or programs that, when executed by a computing device, may cause the computing device to perform one or more tasks. For example, and as will be described in greater detail below, one or more of the components 1202-1208 of the comprehensive subtitle system 214 may represent software stored and configured to run on one or more computing devices, such as the server(s) 206. One or more of the components 1202-1208 of the comprehensive subtitle system 214 shown in FIG. 12 may also represent all or portions of one or more special-purpose computers configured to perform one or more tasks.

As mentioned above, and as shown in FIG. 12, the comprehensive subtitle system 214 can include the waveform manager 1202. In one or more implementations, the waveform manager 1202 can identify and/or generate an input audio waveform from a digital video soundtrack. For example, in one implementation, the waveform manager 1202 can identify an input audio waveform from a repository of waveforms associated with the digital video soundtrack. In additional implementations, the waveform manager 1202 can generate an input audio waveform by extracting a portion of the digital video soundtrack from in-between a starting timestamp and an ending timestamp. The waveform manager 1202 can further track portions of the digital video soundtrack during processing to ensure that all of the soundtrack is processed for subtitle generation—one input audio waveform at a time.

As mentioned above, and as shown in FIG. 12, the comprehensive subtitle system 214 can also include the model manager 1204. As discussed herein, the comprehensive subtitle system 214 can utilize multiple models in automatically generating comprehensive digital video subtitles. Accordingly, the model manager 1204 can generate, train, and apply each of the computational models described herein. Additionally, the model manager 1204 can generate training data for each of the models utilized by the comprehensive subtitle system 214. For example, in some implementations, the model manager 1204 can generate training data for the sound event classification model 402 by extracting manually generated sound event subtitles from digital videos maintained by the digital media system 212, and matching the timestamps associated with those subtitles to corresponding clips from the associated digital videos. The model manager 1204 can also extract the soundtracks from the clips. The model manager 1204 can then utilize the extracted soundtracks and corresponding subtitles as training audio waveforms 504 and ground truth sound event data 506 in training the sound event classification model 402.

As mentioned above, and as shown in FIG. 12, the comprehensive subtitle system 214 can also include the metadata generator 1206. In one or more implementations, the metadata generator 1206 translates subtitle information generated by one or more of the models described herein into digital video display metadata. For example, the metadata generator 1206 can translate subtitle information into digital video display metadata based on specific file formatting requirements (e.g., SRT file format). Additionally, the metadata generator 1206 can generate embedded subtitles based on subtitle information for permanent display within a digital video.

As mentioned above, and as shown in FIG. 12, the comprehensive subtitle system 214 can also include a subtitle file generator 1208. In one or more implementations, the subtitle file generator 1208 can maintain the digital video display metadata generated by the metadata generator 1206 in one or more ways. For example, the subtitle file generator 1208 can maintain digital video display metadata by inserting the digital video display metadata into a subtitle file (e.g., an SRT file), and storing the subtitle file in the repository of subtitle files 222. Additionally, the subtitle file generator 1208 can maintain digital video display metadata by adding the digital video display metadata into a different type of computational storage (e.g., a linked list, a node network) in association with the corresponding digital video. In one or more implementations, the subtitle file generator 1208 can also identify and provide maintained digital video display metadata in connection with its associated digital video in response to a request for the digital video (e.g., when a user of a client computing device 202 requests to stream the digital video via the digital media player 204).

As such, and as described throughout, the comprehensive subtitle system 214 provides solutions for many of the most common problems that exist in example subtitle systems. For example, rather than relying heavily on manually input subtitle information (i.e., as is the case for sound event subtitles), the comprehensive subtitle system 214 is devoid of any such reliance. Instead, the comprehensive subtitle system 214 utilizes a novel approach including multiple computational models—utilized both in serial and in parallel—to automatically generate subtitles reflecting every sound in a digital video's soundtrack.

EXAMPLE EMBODIMENTS

Example 1: A computer-implemented method for automatically generating subtitles for sound events associated with a digital video. For example, the method may include identifying an input audio waveform from a soundtrack of a digital video; applying a sound event classification model to the input audio waveform to: detect one or more sound events within the input audio waveform, each of the one or more sound events comprising sounds other than speech; and generate sound event classification labels and sound event time boundaries for the one or more sound events; translating the sound event classification labels into digital video display metadata describing the one or more sound events; and maintaining the digital video display metadata in association with the digital video for playback within the digital video corresponding to the sound event time boundaries.

Example 2: The computer-implemented method of Example 1, wherein identifying the input audio waveform from the soundtrack of the digital video comprises: determining a channel of the soundtrack; and extracting a portion of the channel between a starting timestamp and an ending timestamp as the input audio waveform.

Example 3: The computer-implemented method of Examples 1 and 2, further comprising training the sound event classification model by: generating training data comprising pairs of training audio waveforms and corresponding ground truth sound event data; and for each pair of training audio waveforms and ground truth sound event data: applying the sound event classification model to the training audio waveform to generate training sound event classification labels and training sound event time boundaries; comparing the training sound event classification labels and training sound event time boundaries to the ground truth sound event data; and modifying parameters of the sound event classification model based on the comparison.

Example 4: The computer-implemented method of any of Examples 1-3, wherein the sound event classification labels are based on an ontology comprising sound event classes describing types of non-verbal sounds and corresponding sound event tags describing specific sounds.

Example 5: The computer-implemented method of any of Examples 1-4, wherein maintaining the digital video display metadata in association with the digital video comprises: identifying a subtitle file associated with the digital video; determining an insertion point within the subtitle file for the digital video display metadata based on the sound event time boundaries; and adding the digital video display metadata to the subtitle file at the insertion point.

Example 6: The computer-implemented method of any of Examples 1-5, wherein maintaining the digital video display metadata in association with the digital video comprises: generating one or more subtitles corresponding to the digital video display metadata; identifying one or more digital video playback positions within the digital video corresponding to the sound event time boundaries; and embedding the one or more subtitles into the digital video at the one or more playback positions.

Example 7: The computer-implemented method of any of Examples 1-6, further comprising: applying a speech music activation detection model to the input audio waveform to generate waveform segments comprising speech; applying a language detection model to the waveform segments comprising speech to generate a spoken language prediction associated with speech within the input audio waveform; and applying a speech transcription model to the waveform segments comprising speech to generate speech transcriptions based on the spoken language prediction and speech time boundaries for the speech transcriptions.

Example 8: The computer-implemented method of any of Examples 1-7, further comprising: applying the speech music activation detection model to the input audio waveform to generate waveform segments comprising music; applying a music classification model to the waveform segments comprising music to generate music classification predictions for the waveform segments comprising music and music classification time boundaries for the music classification predictions; and applying a lyric recognition model to the waveform segments comprising music to generate lyric transcriptions for the waveform segments comprising music and lyric time boundaries for the lyric transcriptions.

Example 9: The computer-implemented method of any of Examples 1-8, further comprising: translating one or more of the speech transcriptions, the music classification predictions, or the lyric transcriptions into additional digital video display metadata; and maintaining the additional digital video display metadata in association with the digital video such that digital video subtitles based on the additional digital video display metadata may be displayed at playback positions within the digital video corresponding to one or more of one or more of the speech time boundaries for the speech transcriptions, the music classification time boundaries for the music classification predictions, or the lyric time boundaries for the lyric transcriptions.

Example 10: The computer-implemented method of any of Examples 1-9, further comprising training the music classification model to generate music classification predictions for waveform segments comprising music that predict a mood of a digital video scene in between playback positions corresponding to the music classification time boundaries for the music classification predictions.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying an input audio waveform from a soundtrack of a digital video;
    applying a sound event classification model to the input audio waveform to:
        detect one or more sound events within the input audio waveform, each of the one or more sound events comprising sounds other than speech; and
        generate sound event classification labels and sound event time boundaries for the one or more sound events;
    translating the sound event classification labels into digital video display metadata describing the one or more sound events; and
    maintaining the digital video display metadata in association with the digital video for playback within the digital video corresponding to the sound event time boundaries by adding the digital video display metadata to a subtitle file associated with the digital video at an insertion point that is determined based on the sound event time boundaries.

2. The computer-implemented method of claim 1, wherein identifying the input audio waveform from the soundtrack of the digital video comprises:
    determining a channel of the soundtrack; and
    extracting a portion of the channel between a starting timestamp and an ending timestamp as the input audio waveform.

3. The computer-implemented method of claim 1, further comprising training the sound event classification model by:
    generating training data comprising pairs of training audio waveforms and corresponding ground truth sound event data; and
    for each pair of training audio waveforms and ground truth sound event data:
        applying the sound event classification model to the training audio waveform to generate training sound event classification labels and training sound event time boundaries;
        comparing the training sound event classification labels and training sound event time boundaries to the ground truth sound event data; and
        modifying parameters of the sound event classification model based on the comparison.

4. The computer-implemented method of claim 1, wherein the sound event classification labels are based on an ontology comprising sound event classes describing types of non-verbal sounds and corresponding sound event tags describing specific sounds.

5. The computer-implemented method of claim 1, wherein adding the digital video display metadata to the subtitle file associated with the digital video comprises:
    identifying a starting timestamp and an ending timestamp corresponding to the sound event time boundaries within the digital video;
    adding the digital video display metadata to the subtitle file at an insertion point corresponding to the starting timestamp.

6. The computer-implemented method of claim 1, wherein maintaining the digital video display metadata in association with the digital video comprises:
    generating one or more subtitles corresponding to the digital video display metadata;
    identifying one or more digital video playback positions within the digital video corresponding to the sound event time boundaries; and
    embedding the one or more subtitles into the digital video at the one or more digital video playback positions.

7. The computer-implemented method of claim 1, further comprising:
    applying a speech music activation detection model to the input audio waveform to generate waveform segments comprising speech;
    applying a language detection model to the waveform segments comprising speech to generate a spoken language prediction associated with speech within the input audio waveform; and
    applying a speech transcription model to the waveform segments comprising speech to generate speech transcriptions based on the spoken language prediction and speech time boundaries for the speech transcriptions.

8. The computer-implemented method of claim 7, further comprising:
    applying the speech music activation detection model to the input audio waveform to generate waveform segments comprising music;
    applying a music classification model to the waveform segments comprising music to generate music classification predictions for the waveform segments comprising music and music classification time boundaries for the music classification predictions; and
    applying a lyric recognition model to the waveform segments comprising music to generate lyric transcriptions for the waveform segments comprising music and lyric time boundaries for the lyric transcriptions.

9. The computer-implemented method of claim 8, further comprising:
    translating one or more of the speech transcriptions, the music classification predictions, or the lyric transcriptions into additional digital video display metadata; and
    maintaining the additional digital video display metadata in association with the digital video such that digital video subtitles based on the additional digital video display metadata may be displayed at playback positions within the digital video corresponding to one or more of one or more of the speech time boundaries for the speech transcriptions, the music classification time boundaries for the music classification predictions, or the lyric time boundaries for the lyric transcriptions.

10. The computer-implemented method of claim 8, further comprising training the music classification model to generate music classification predictions for waveform segments comprising music that predict a mood of a digital video scene in between playback positions corresponding to the music classification time boundaries for the music classification predictions.

11. A system comprising:
   at least one physical processor; and
   physical memory comprising computer-executable instructions that, when executed by the at least one physical processor, cause the at least one physical processor to perform acts comprising:
   identifying an input audio waveform from a soundtrack of a digital video;
   applying a sound event classification model to the input audio waveform to:
   detect one or more sound events within the input audio waveform, each of the one or more sound events comprising sounds other than speech; and
   generate sound event classification labels and sound event time boundaries for the one or more sound events;
   translating the sound event classification labels into digital video display metadata describing the one or more sound events; and
   maintaining the digital video display metadata in association with the digital video for playback within the digital video corresponding to the sound event time boundaries by adding the digital video display metadata to a subtitle file associated with the digital video at an insertion point that is determined based on the sound event time boundaries.

12. The system of claim 11, wherein identifying the input audio waveform from the soundtrack of the digital video comprises:
   determining a channel of the soundtrack; and
   extracting a portion of the channel between a starting timestamp and an ending timestamp as the input audio waveform.

13. The system of claim 11, further comprising computer-executable instructions that, when executed by the at least one physical processor, cause the at least one physical processor to perform an act of training the sound event classification model by:
   generating training data comprising pairs of training audio waveforms and corresponding ground truth sound event data; and
   for each pair of training audio waveforms and ground truth sound event data:
   applying the sound event classification model to the training audio waveform to generate training sound event classification labels and training sound event time boundaries;
   comparing the training sound event classification labels and training sound event time boundaries to the ground truth sound event data; and
   modifying parameters of the sound event classification model based on the comparison.

14. The system of claim 11, wherein adding the digital video display metadata to the subtitle file associated with the digital video comprises:
   identifying with a starting timestamp and an ending timestamp corresponding to the sound event time boundaries within the digital video;
   adding the digital video display metadata to the subtitle file at an insertion point corresponding to the starting timestamp.

15. The system of claim 11, wherein maintaining the digital video display metadata in association with the digital video comprises:
   generating one or more subtitles corresponding to the digital video display metadata;
   identifying one or more digital video playback positions within the digital video corresponding to the sound event time boundaries; and
   embedding the one or more subtitles into the digital video at the one or more digital video playback positions.

16. The system of claim 11, further comprising computer-executable instructions that, when executed by the at least one physical processor, cause the at least one physical processor to perform acts comprising:
   applying a speech music activation detection model to the input audio waveform to generate waveform segments comprising speech;
   applying a language detection model to the waveform segments comprising speech to generate a spoken language prediction associated with speech within the input audio waveform; and
   applying a speech transcription model to the waveform segments comprising speech to generate speech transcriptions based on the spoken language prediction and speech time boundaries for the speech transcriptions.

17. The system of claim 16, further comprising computer-executable instructions that, when executed by the at least one physical processor, cause the at least one physical processor to perform acts comprising:
   applying the speech music activation detection model to the input audio waveform to generate waveform segments comprising music;
   applying a music classification model to the waveform segments comprising music to generate music classification predictions for the waveform segments comprising music and music classification time boundaries for the music classification predictions; and
   applying a lyric recognition model to the waveform segments comprising music to generate lyric transcriptions for the waveform segments comprising music and lyric time boundaries for the lyric transcriptions.

18. The system of claim 17, further comprising computer-executable instructions that, when executed by the at least one physical processor, cause the at least one physical processor to perform acts comprising:
   translating one or more of the speech transcriptions, the music classification predictions, or the lyric transcriptions into additional digital video display metadata; and
   maintaining the additional digital video display metadata in association with the digital video such that digital video subtitles based on the additional digital video display metadata may be displayed at playback positions within the digital video corresponding to one or more of one or more of the speech time boundaries for the speech transcriptions, the music classification time boundaries for the music classification predictions, or the lyric time boundaries for the lyric transcriptions.

19. The system of claim 17, further comprising computer-executable instructions that, when executed by the at least one physical processor, cause the at least one physical processor to perform an act comprising training the music classification model to generate music classification predictions for waveform segments comprising music that predict a mood of a digital video scene in between playback positions corresponding to the music classification time boundaries for the music classification predictions.

20. A computer-implemented method comprising:
generating an input audio waveform from a soundtrack of a digital video;
applying, in parallel:
- a sound event classification model to the input audio waveform to generate sound event classification labels; and
- a speech music activation detection model to the input audio waveform to generate waveform segments comprising speech and waveform segments comprising music;

applying:
- a music classification model to the waveform segments comprising music to generate music classification predictions for the waveform segments comprising music;

and
generating a subtitle file associated with the digital video comprising one or more of the sound event classification labels and the music classification predictions.

* * * * *